United States Patent
Wu

(10) Patent No.: US 7,546,773 B2
(45) Date of Patent: Jun. 16, 2009

(54) PRESSURE GAUGE

(76) Inventor: Scott Wu, No.6, Lane 176, Wu Fu Road, Wu Feng Hsiang, Taichung Hsien (TW)

( * ) Notice: Subject to any disclaimer, the term of this patent is extended or adjusted under 35 U.S.C. 154(b) by 0 days.

(21) Appl. No.: 11/743,711

(22) Filed: May 3, 2007

(65) Prior Publication Data

US 2008/0271540 A1    Nov. 6, 2008

(51) Int. Cl.
*G01L 7/04*   (2006.01)
(52) U.S. Cl. ...................................................... 73/732
(58) Field of Classification Search ............ 73/732; 116/288
See application file for complete search history.

(56) References Cited

U.S. PATENT DOCUMENTS

| | | | | |
|---|---|---|---|---|
| 2,084,089 A | * | 6/1937 | Jones | 73/708 |
| 3,603,282 A | * | 9/1971 | Abromaitis | 116/288 |
| 3,875,800 A | * | 4/1975 | Stockton | 374/198 |
| 4,520,668 A | * | 6/1985 | Allemano | 73/300 |
| 4,773,271 A | * | 9/1988 | Mutou et al. | 73/741 |
| 6,301,764 B1 | * | 10/2001 | Klein et al. | 29/412 |

OTHER PUBLICATIONS

Taiwanese M264493, 8 pages.

* cited by examiner

*Primary Examiner*—Andre J Allen
(74) *Attorney, Agent, or Firm*—Alan Kamrath; Karmath & Associates PA

(57) ABSTRACT

A pressure gauge includes a core, a first dial, a first hand, a second dial, a second hand and a gear system. The core includes a body, a joint connected to the body and a Bourdon tube connected to the body. The first dial is connected to a side of the core for showing a large range of pressure. The first hand is located on the first dial. The second dial is connected to an opposite side of the core for showing a small range of pressure. The second hand is located on the second dial. The gear system connects the Bourdon tube to the first and second hands.

20 Claims, 8 Drawing Sheets

PRESSURE GAUGE

BACKGROUND OF INVENTION

1. Field of Invention

The present invention relates to a pressure gauge and, more particularly, to a pressure gauge for showing two different ranges of pressure on opposite sides.

2. Related Prior Art

Generally, a pressure gauge is used to measure the pressure in one sort of items. In the field of bicycles, a pressure gauge is used to measure the pressure in a front cushion as well as the pressure in a rear cushion. A proper limit for the pressure in a front cushion is 100 psi due to light loads while a proper limit for the pressure in a rear cushion is below 300 psi due to heavy loads. A typical pressure gauge includes only one dial. If the dial shows a range of 0 to 300 psi. It is possible for a user to read the pressure in a rear cushion from the dial. However, it is difficult for the user to precisely read the pressure in a front cushion from the dial. If the dial shows a range of 0 to 100 psi, it is possible for a user to precisely read the pressure in a front cushion. However, it is difficult for the user to read a value of pressure in a rear cushion. Firstly, the user counts how many rounds a hand has rotated relative to the dial before it finally stops. Secondly, the user observes the reading. shown by the hand on the dial. Thirdly, the user draws a product by multiplying the number of rounds by 100 psi. Finally, the user can get the value of pressure by adding the product to the reading.

Disclosed in Taiwanese Patent M264493 is a conventional pressure gauge with two identical dials and two hands. This conventional pressure gauge enables a user to read a value of pressure from both sides thereof. However, the dials are good only for showing a range identical to each other.

The present invention is therefore intended to obviate or at least alleviate the problems encountered in the prior art.

SUMMARY OF INVENTION

According to the present invention, a pressure gauge includes a core, a first dial, a first hand, a second dial, a second hand and a gear system. The core includes a body, a joint connected to the body and a Bourdon tube connected to the body. The first dial is connected to a side of the core for showing a large range of pressure. The first hand is located on the first dial. The second dial is connected to an opposite side of the core for showing a small range of pressure. The second hand is located on the second dial. The gear system connects the Bourdon tube to the first and second hands.

The primary advantage of the pressure gauge according to the present invention is enabling a user to read a value of pressure on the first dial and more precisely read another value of pressure on the second dial.

Other advantages and features of this invention will become apparent from the following description referring to the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
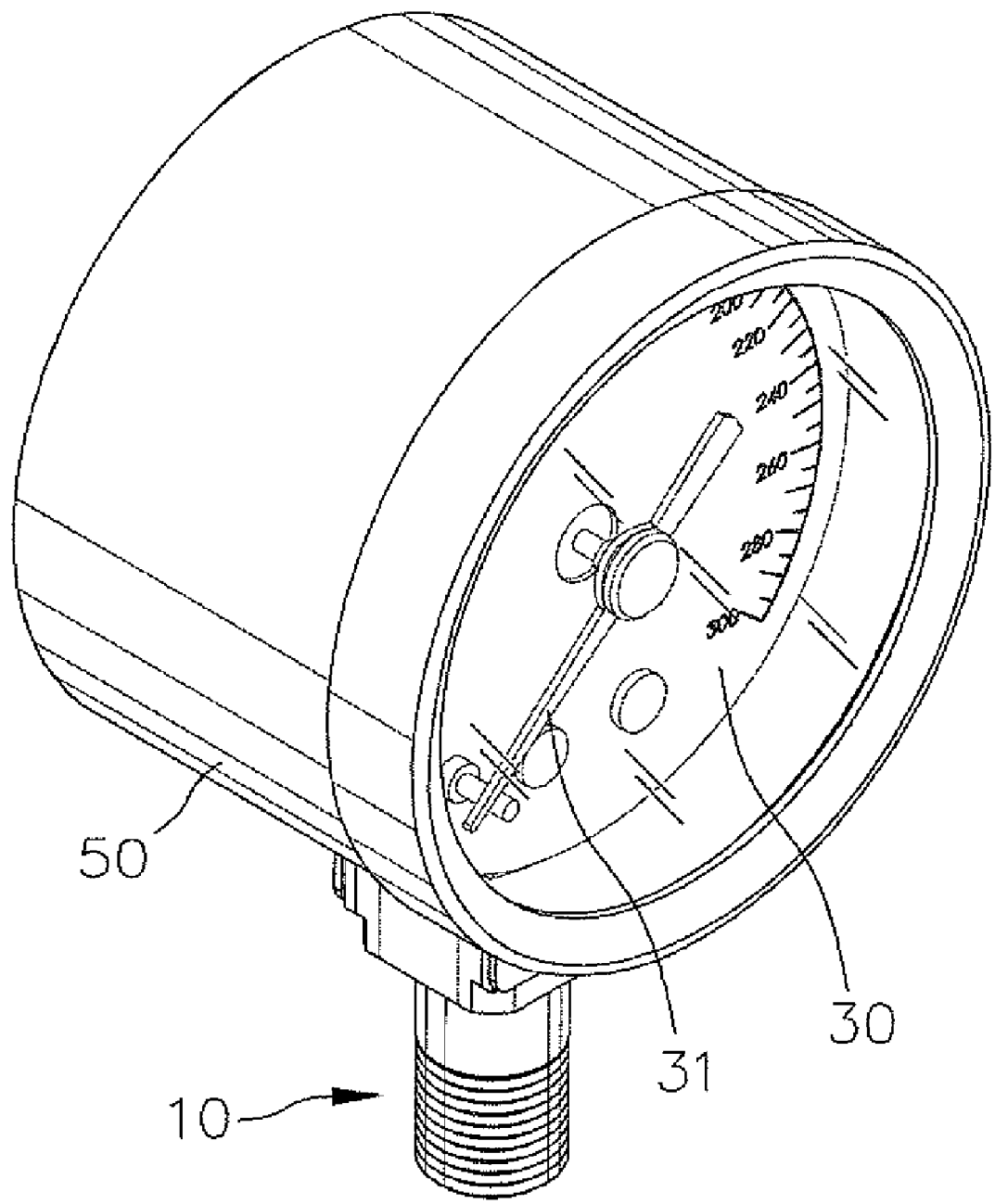
FIG. 1 is a perspective view of a pressure gauge according to the preferred embodiment of the present invention.
Figure 2:
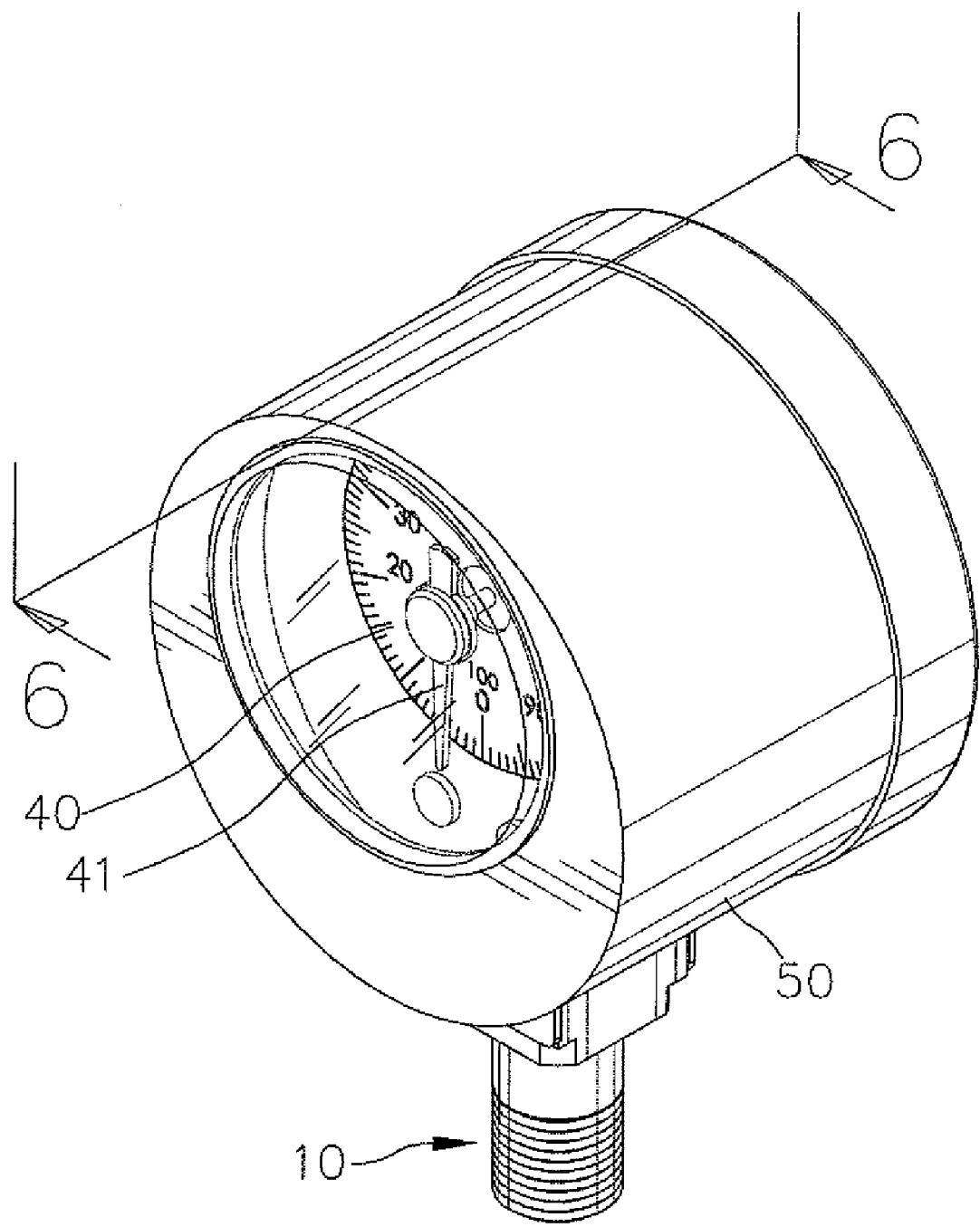
FIG. 2 is another perspective view of the pressure gauge of FIG. 1.
Figure 3:
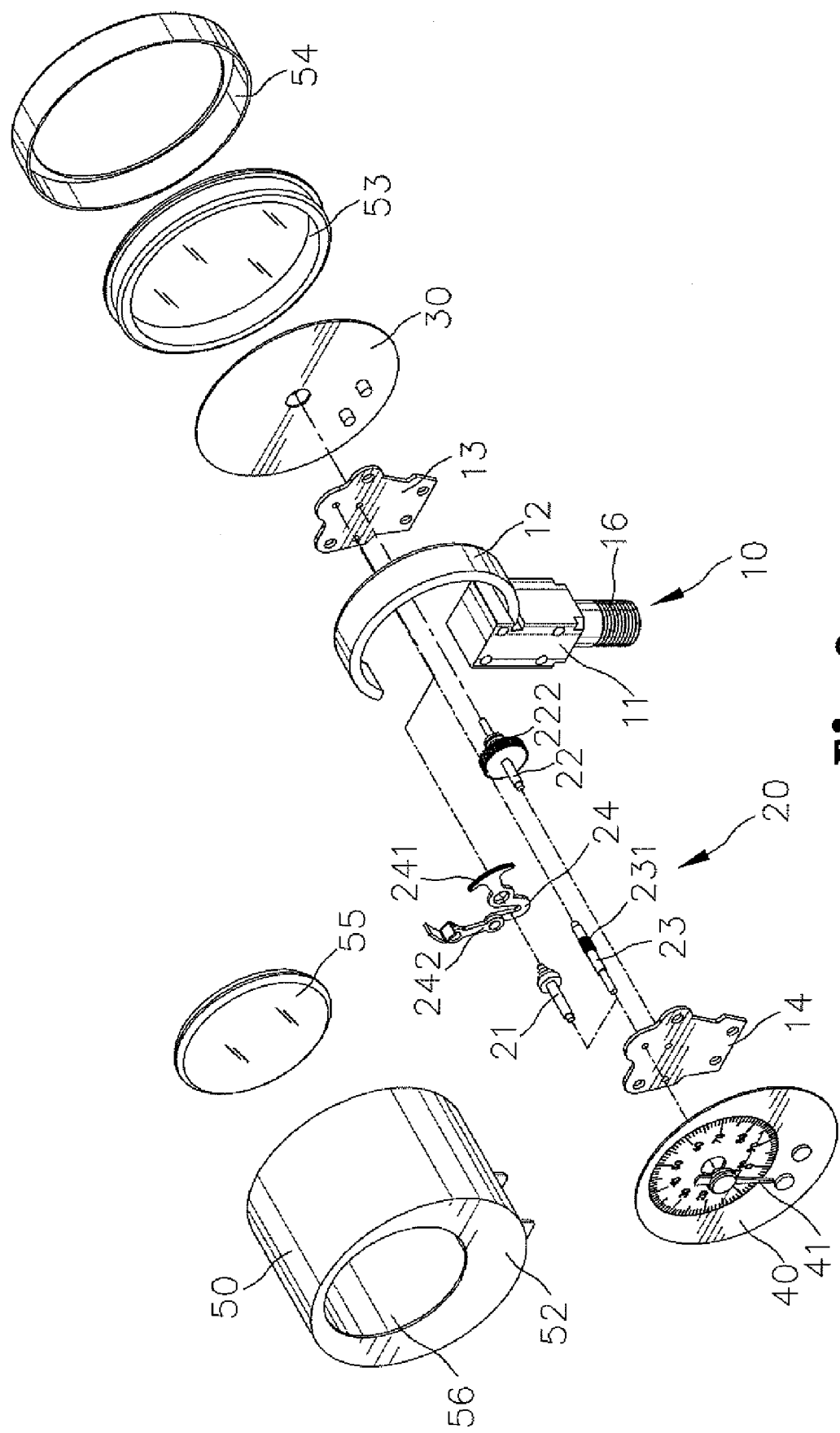
FIG. 3 is an exploded view of the pressure gauge shown in FIG. 2.

Referring to FIGS. 1 to 3, a pressure gauge includes a core 10, a gear system 20, two dials 30 and 40 and a shell 50 according to the preferred embodiment of the present invention. The dial 30 shows a large range of pressure such as 0 to 300 psi. The dial 40 shows a small range of pressure such as 0 to 100 psi.

The core 10 includes a body 11, a joint 16 connected to the body 11, a Bourdon tube 12 connected to the body 11 and two plates 13 and 14 attached to body 11 on opposite sides.

The gear system 20 includes a pin 21, two shafts 22 and 23 and a rocker 24. The rocker 24 is rotationally mounted on the pin 21. The pin 21 is supported between and by the plates 13 and 14. The shafts 22 and 23 are rotationally supported between and by the plates 13 and 14.

The rocker 24 includes a rack 241 formed at an end and a connector 242 formed at another end. The connector 242 is in contact with an end of the Bourdon tube 12.

Figure 4:
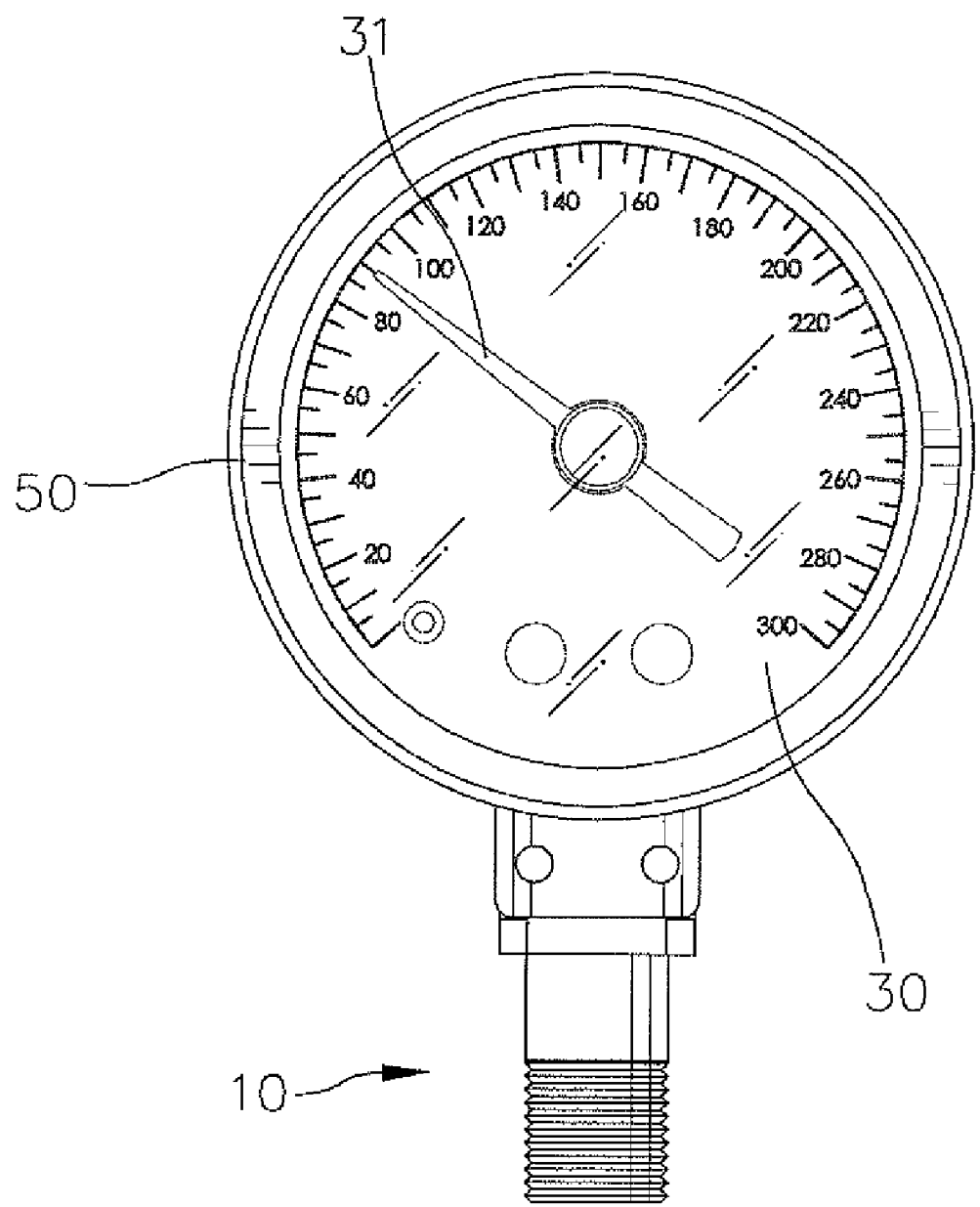
FIG. 4 is a front view of the pressure gauge shown in FIG. 1.
Figure 5:
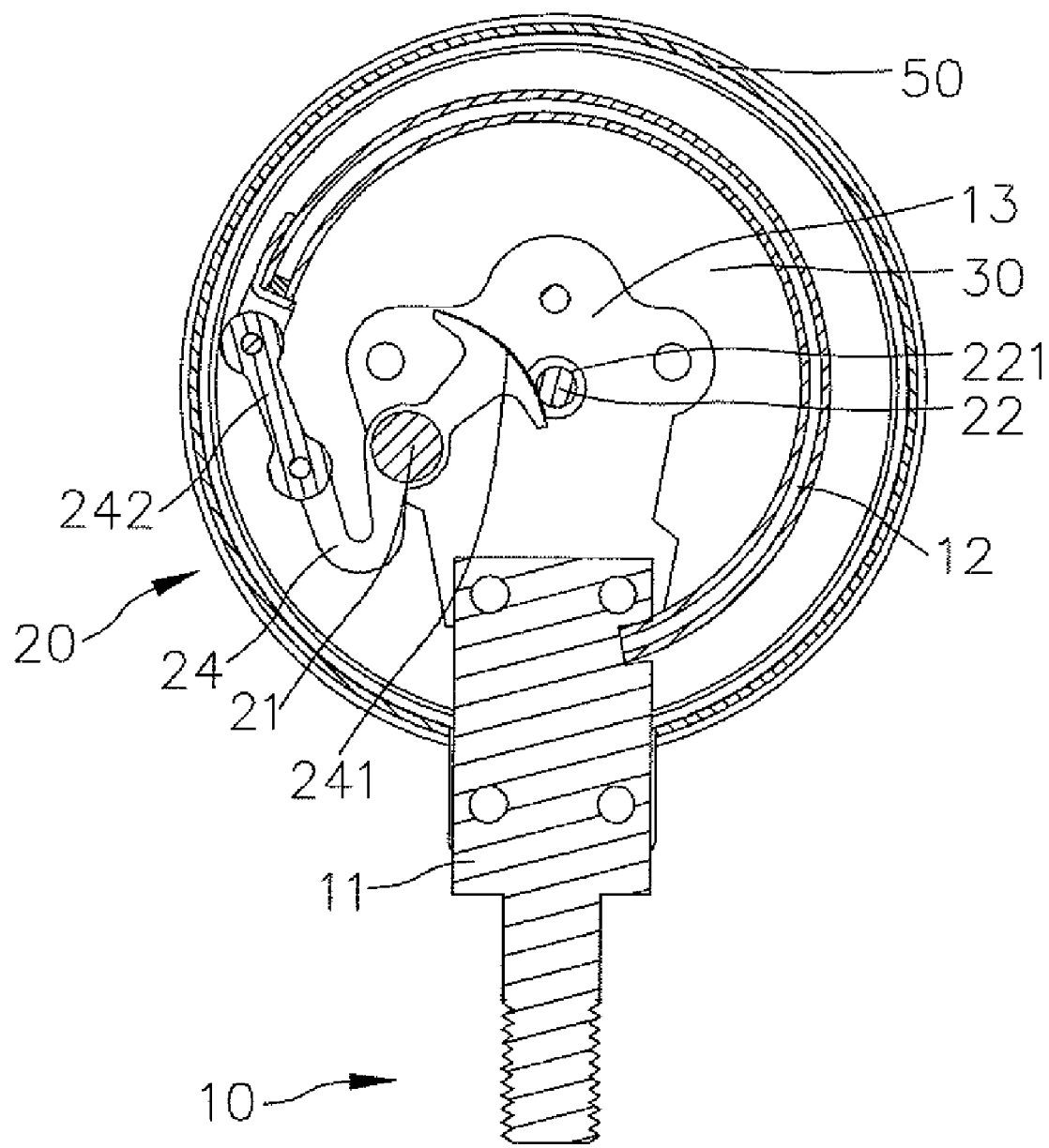
FIG. 5 is a cross-sectional view of the pressure gauge shown in FIG. 1.

Referring to FIGS. 3 to 5, two gears 221 and 222 are formed on the shaft 22. The size of the gear 221 is smaller than that of the gear 222. The gear 221 is engaged with the rack 241. The shaft 22 includes an end inserted through an aperture defined in the dial 30 and connected to a hand 31.

Referring to FIGS. 3 and 6 to 8, a gear 231 is formed on the shaft 23. The gear 231 is engaged with the gear 222. The shaft 23 includes an end inserted through an aperture defined in the dial 40 and connected to a hand 41.

The shell 50 includes a window 51 defined in an end and a panel 52 formed at an opposite end. The panel 52 includes a window 56 defined therein and covered by a lens 55. The core 10, the gear system 20, the dials 30 and 40 and the hands 31 and 41 are disposed in the shell 50. The window 51 is covered by a lens 53. A ring 54 is connected to the shell 50 for retaining the lens 53 in the shell 50.

In use, the joint 16 is connected to a valve of a cushion so that the pressure in the Bourdon tube 12 is identical to the pressure in the cushion. Thus, the pressure in the cushion can be measured.

Referring to FIGS. 4 and 5, due to the rise in pressure, the Bourdon tube 12 extends. Because of the contact of the Bourdon tube 12 with the connector 242, the Bourdon tube 12 pivots the rocker 24. Due to the engagement of the rack 241 .with the gear 221, the rocker 24 rotates the shaft 22. Due to the connection of the shaft 22 to the hand 31, the shaft 22 rotates the hand 31 clockwise with respect to the dial 30. The dial 30 shows a range of 0 to 300 psi.

Figure 6:
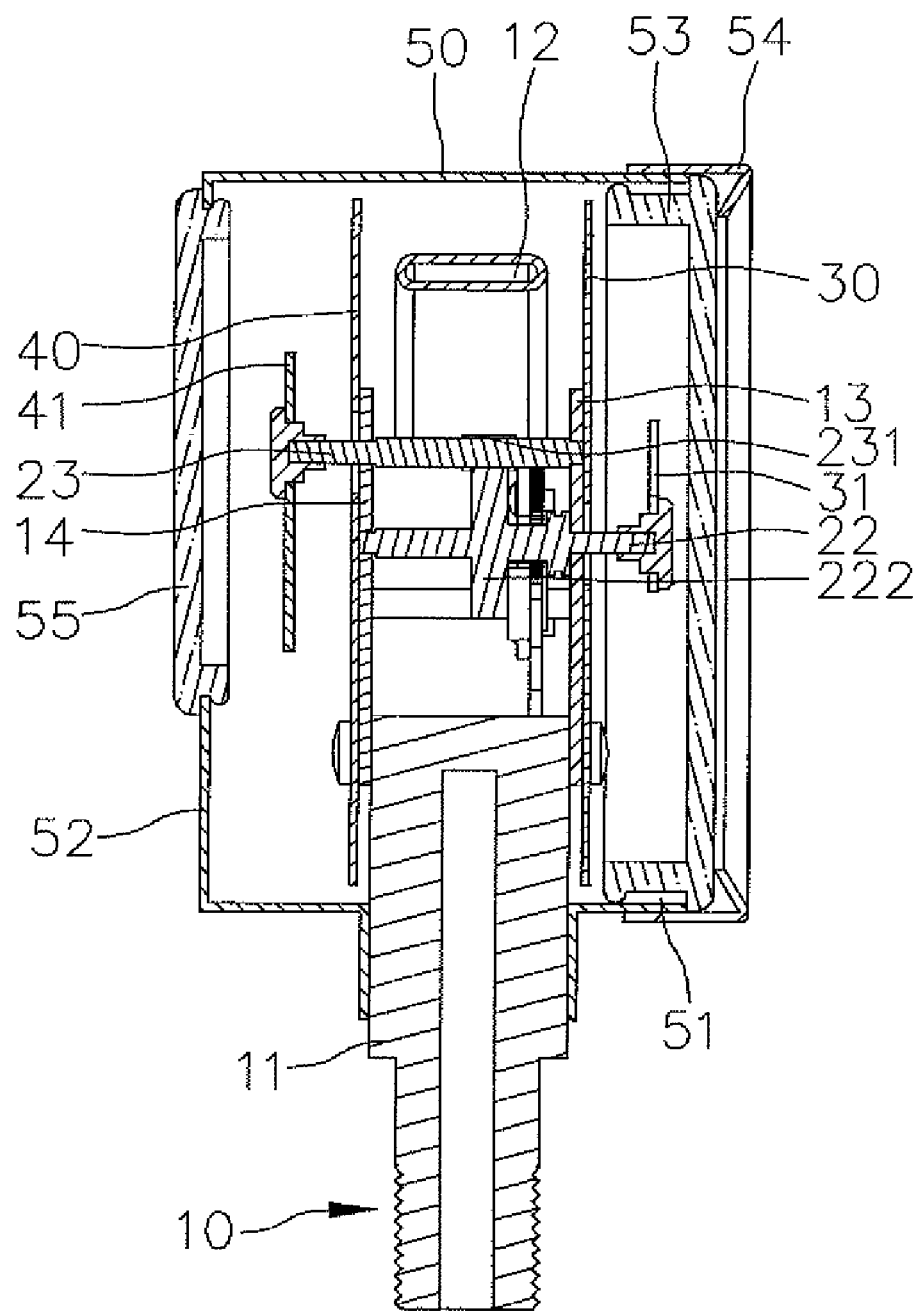
FIG. 6 is a cross-sectional view of the pressure gauge shown in FIG. 5.
Figure 7:
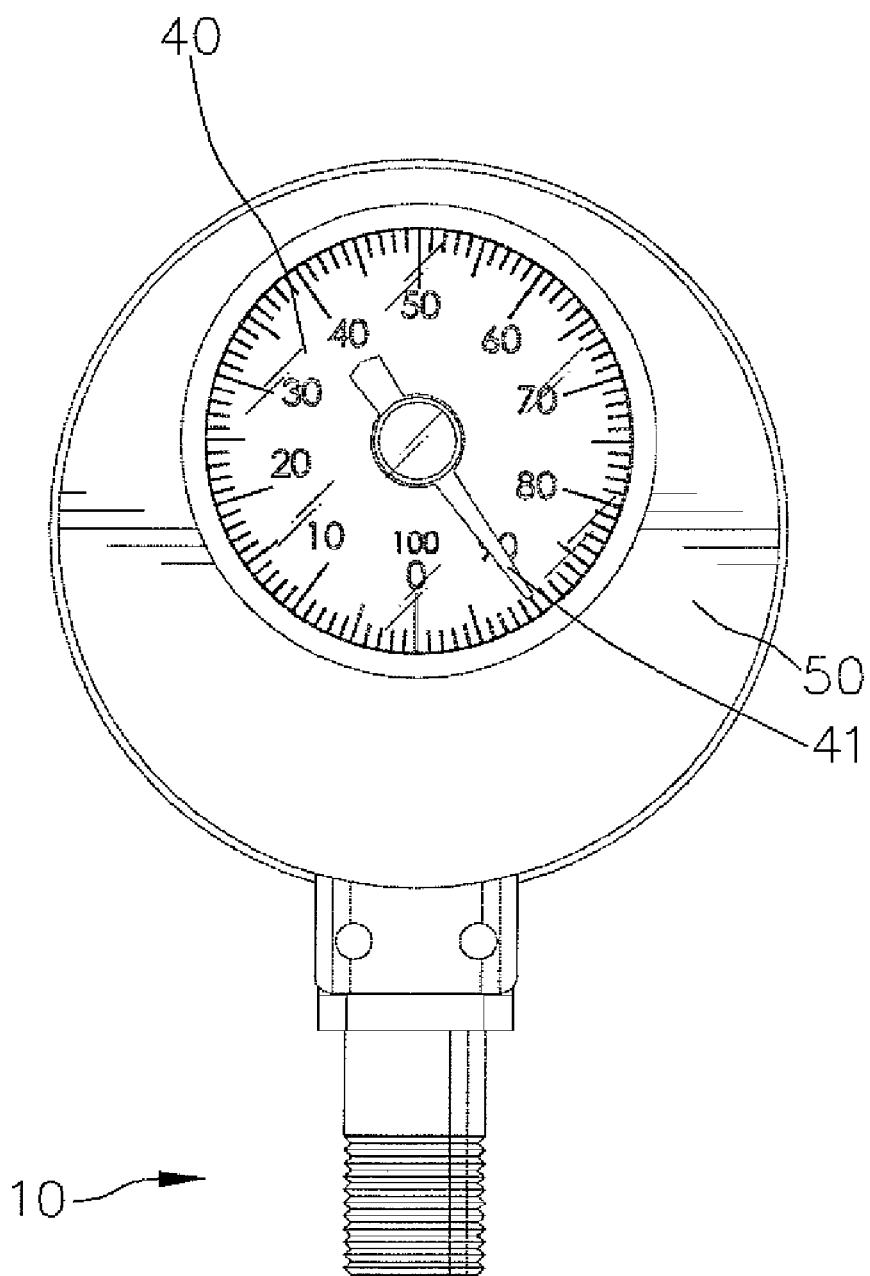
FIG. 7 is a rear view of the pressure gauge shown in FIG. 1.
Figure 8:
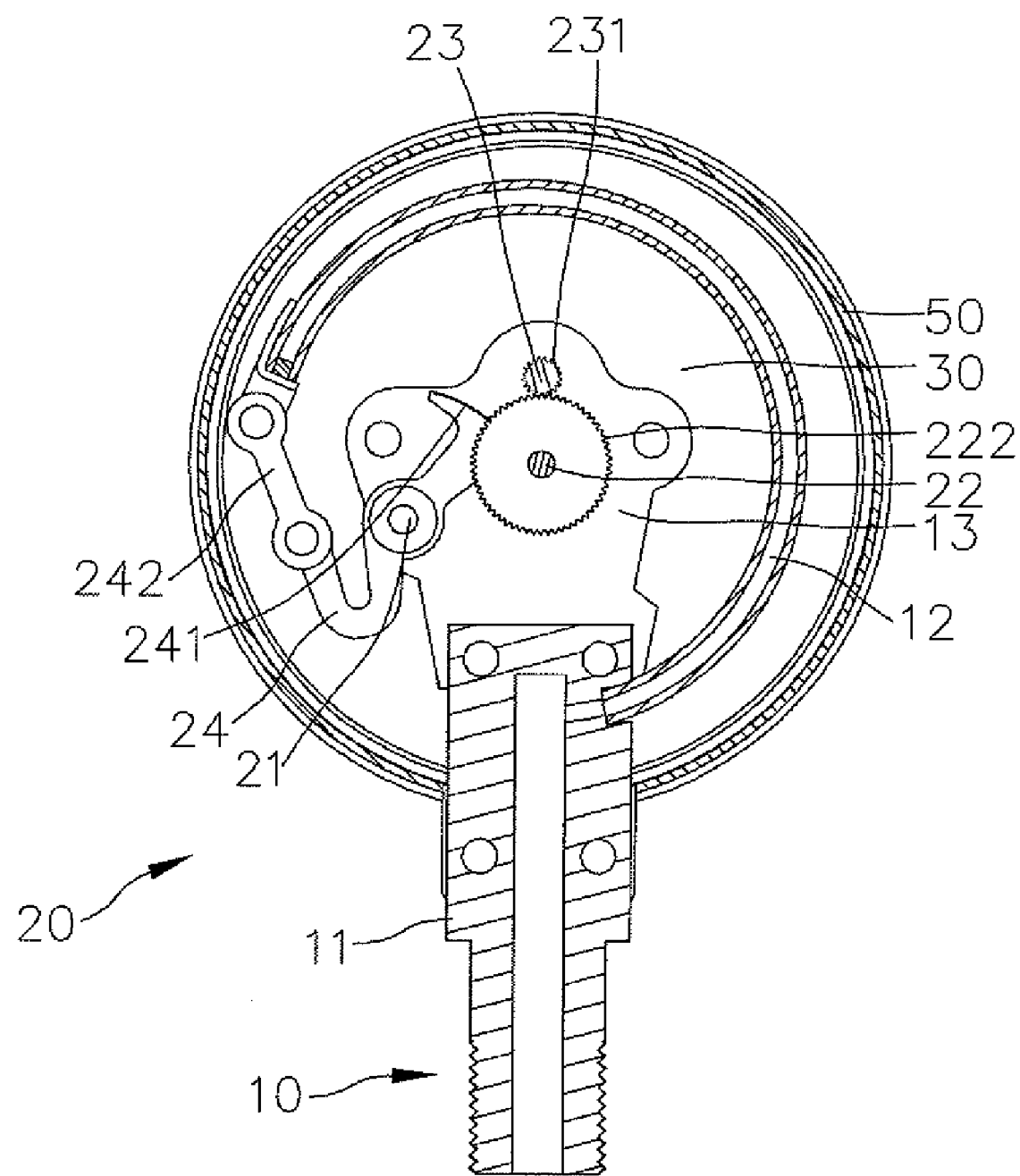
FIG. 8 is a cross-sectional view of the pressure gauge shown in FIG. 7.

Referring to FIGS. 6 to 8, due to the engagement of the gear 222 with the gear 231, the shaft 22 rotates the shaft 23. Due to the connection of the shaft 23 to the hand 41, the shaft 23 rotates the hand 41 clockwise with respect to the dial 40. The dial 40 shows a range of 0 to 100 psi. Since the hand 31 is connected to the shaft 22 and the shaft 22 rotates the shaft 23 connected to the hand 41, the first and second hands 31 and 41 simultaneousl move relative to the first and second dials 30 and 40 by the sear system 20.

While measuring the pressure in a rear cushion with the pressure gauge, a user observes the hand 31 on the dial 30 without having to pay attention to the hand 41 on the dial 40.

While measuring the pressure in a front cushion with the pressure gauge, the user observes the hand 41 on the dial 40 without having to pay attention to the hand 31 on the dial 30.

The pressure gauge according to the present invention exhibits several advantages over the conventional pressure gauge discussed in the RELATED PRIOR ART. Firstly, it enables a user to read a value of pressure on one of the dials and more precisely read another value of pressure on the remaining dial.

Secondly, it enables a user to read values of pressure on the dials without mistake since the hands rotate clockwise relative to the dials.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A pressure gauge comprising:
   a core comprising a body, a joint connected to the body and a Bourdon tube connected to the body;
   a first dial connected to the core for showing a large range of pressure;
   a first hand located before and moveable relative to the first dial;
   a second dial connected to the core for showing a small range of pressure;
   a second hand located before and moveable relative to the second dial; and
   a gear system connecting the Bourdon tube to the first and second hands, with the first and second hands simultaneously moveable relative to the first and second dials by the gear system.

2. A pressure gauge comprising:
   a core comprising a body, a joint connected to the body and a Bourdon tube connected to the body;
   a first dial connected to a side of the core for showing a large range of pressure;
   a first hand located before the first dial;
   a second dial connected to an opposite side of the core for showing a small range of pressure;
   a second hand located before the second dial; and
   a gear system for connecting the Bourdon tube to the first and second hands, wherein the gear system comprises:
   a pin;
   a rocker mounted on the pin and formed with a rack and a connector in contact with the Bourdon tube;
   a first shaft connected to the first hand and formed with a large gear and a small gear engaged with the rack; and
   a second shaft connected to the second hand and formed with a gear engaged with the large gear of the first shaft.

3. The pressure gauge according to claim 2 wherein the large gear of the first shaft is larger than the gear of the second shaft.

4. The pressure gauge according to claim 2 wherein the core comprises two plates attached to the body for supporting the pin and the first and second shafts.

5. The pressure gauge according to claim 1 wherein the large range of pressure is 0 to 300 psi.

6. The pressure gauge according to claim 1 wherein the small range of pressure is 0 to 100 psi.

7. The pressure gauge according to claim 1 comprising a shell containing the core, the first and second hands, the first and second dials and the gear system.

8. The pressure gauge according to claim 7 wherein the shell comprises a first window through which the first hand and the first dial are observable.

9. The pressure gauge according to claim 8 comprising a first lens covering the first window.

10. The pressure gauge according to claim 9 comprising a ring attached to the shell retaining the first lens in the shell.

11. The pressure gauge according to claim 7 wherein the shell comprises a second window through which the second hand and the second dial are observable.

12. The pressure gauge according to claim 11 comprising a second lens covering the second window.

13. The pressure gauge according to claim 1 wherein the first dial is connected to a side of the core and the second dial is connected to an opposite side of the core, and wherein the Bourdon tube is located between the first and second dials and between the first and second hands.

14. The pressure gauge according to claim 2 wherein the first dial is connected to a side of the core and the second dial is connected to an opposite side of the core, and wherein the Bourdon tube is located between the first and second dials and between the first and second hands.

15. The pressure gauge according to claim 2 wherein the large range of pressure is 0 to 300 psi.

16. The pressure gauge according to claim 2 wherein the small range of pressure is 0 to 100 psi.

17. The pressure gauge according to claim 2 comprising a shell containing the core, the first and second hands, the first and second dials and the gear system.

18. The pressure gauge according to claim 17 wherein the shell comprises a first window through which the first hand and the first dial are observable.

19. The pressure gauge according to claim 18 comprising a first lens covering the first window.

20. The pressure gauge according to claim 19 comprising a ring attached to the shell retaining the first lens in the shell.

\* \* \* \* \*